United States Patent [19]

Asanuma et al.

[11] Patent Number: 5,627,754

[45] Date of Patent: May 6, 1997

[54] METHOD FOR CONTROLLING A FRONT AND REAR WHEEL STEERING VEHICLE

[75] Inventors: Nobuyoshi Asanuma; Kiyoshi Wakamatsu; Manabu Ikegaya, all of Saitama-ken, Japan

[73] Assignee: Honda Giken Kogyo Kabushiki Kaisha, Tokyo, Japan

[21] Appl. No.: 398,138

[22] Filed: Mar. 3, 1995

[30] Foreign Application Priority Data

Mar. 18, 1994 [JP] Japan .................................. 6-074202

[51] Int. Cl.$^6$ .................................................. B62D 6/00
[52] U.S. Cl. ............................. 364/424.051; 180/408; 180/423; 280/91.1
[58] Field of Search ...................... 364/424.05, 426.03, 364/424.04; 180/140, 141, 142, 79.1, 408, 410, 411, 412, 419, 423; 280/91.1

[56] References Cited

U.S. PATENT DOCUMENTS

| | | | |
|---|---|---|---|
| 4,720,790 | 1/1988 | Miki et al. | 364/424.05 |
| 4,796,904 | 1/1989 | Kubo et al. | 280/91 |
| 4,834,205 | 5/1989 | Mizuno et al. | 180/141 |
| 4,958,698 | 9/1990 | Kirschner | 180/140 |
| 4,998,593 | 3/1991 | Karnopp et al. | 180/140 |
| 5,010,971 | 4/1991 | Hamada et al. | 180/140 |
| 5,018,078 | 5/1991 | Eguchi | 364/424.05 |
| 5,019,982 | 5/1991 | Furukawa | 364/424.05 |
| 5,020,619 | 6/1991 | Kanazawa et al. | 180/140 |
| 5,069,475 | 12/1991 | Yonekawa et al. | 180/142 |
| 5,116,254 | 5/1992 | Sano et al. | 180/142 |
| 5,147,008 | 9/1992 | Nishimore et al. | 180/140 |
| 5,184,298 | 2/1993 | Imaseki et al. | 364/424.05 |
| 5,337,850 | 8/1994 | Mouri et al. | 180/140 |
| 5,365,440 | 11/1994 | Abe et al. | 364/424.05 |
| 5,386,365 | 1/1995 | Nagaoka | 364/424.05 |

FOREIGN PATENT DOCUMENTS 59-77970  5/1984  Japan .

*Primary Examiner*—Kevin J. Teska
*Assistant Examiner*—Tan Nguyen
*Attorney, Agent, or Firm*—Weiner, Carrier & Burt, P.C.; Joseph P. Carrier; Irving M. Weiner

[57] ABSTRACT

To the end of ensuring a brisk maneuverability of a front and rear wheel steering vehicle without causing any unstable behavior of the vehicle, the rear wheels are steered in an opposite phase relationship to the front wheels to offset an under-steer tendency of the vehicle when a lateral acceleration acting on the vehicle is between a first prescribed value and a second prescribed value higher than the first prescribed value, and the vehicle would otherwise demonstrate an under-steer tendency, and in a same phase relationship to the front wheels to prevent an excessive slip angle from developing in the rear wheels when the detected lateral acceleration is greater than the second prescribed value, and the slip angle of the rear wheels would otherwise develop an excessive slip angle. In other words, the rear wheels are steered in an opposite phase relationship to the front wheels so long as a lateral acceleration acting on the vehicle is within a range which would not give rise to any excessive slip angle of the rear wheels.

20 Claims, 12 Drawing Sheets

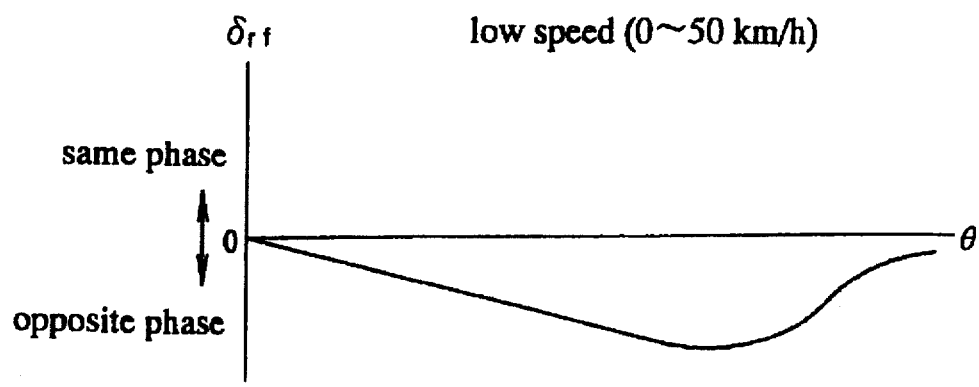
*Fig. 14* (a) low speed (0~50 km/h)
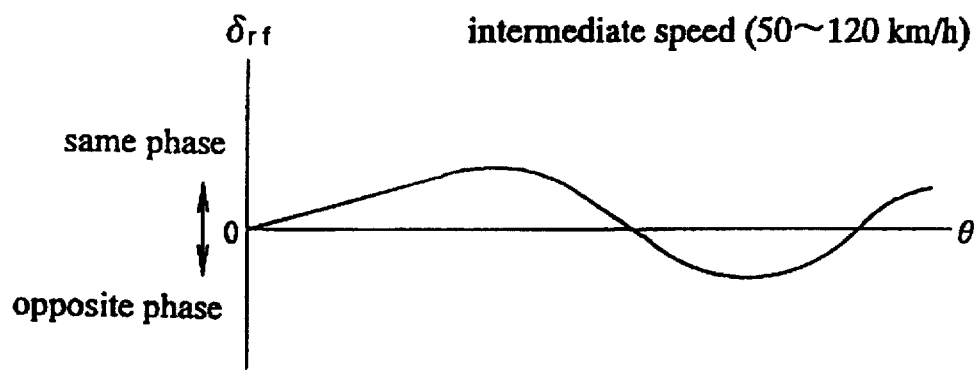
*Fig. 14* (b) intermediate speed (50~120 km/h)
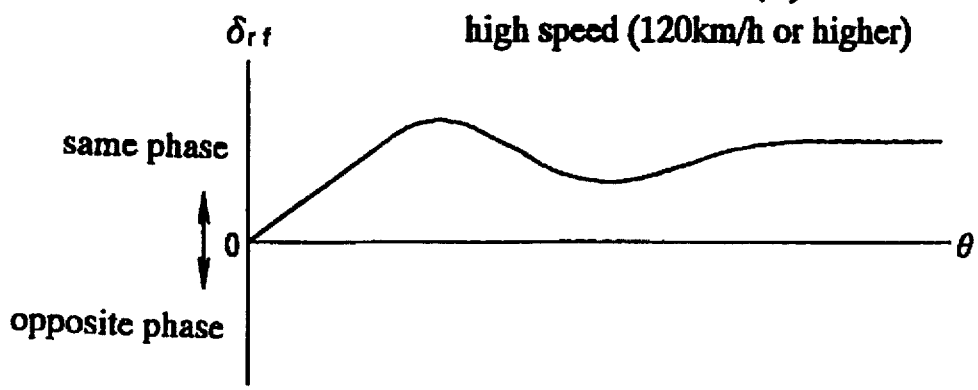
*Fig. 14* (c) high speed (120km/h or higher)

METHOD FOR CONTROLLING A FRONT AND REAR WHEEL STEERING VEHICLE

TECHNICAL FIELD

The present invention relates to a method for controlling a front and rear wheel steering vehicle, and in particular to a method for controlling a front and rear wheel steering vehicle which can optimize the maneuverability and stability of the vehicle even when making a turn in a high lateral acceleration region.

BACKGROUND OF THE INVENTION

It was previously proposed to the end of improving the maneuverability of a front and rear wheel steering vehicle in large steering angle situations to appropriately adjust the steering angle of the rear wheels in relation to the steering angle of the front wheels. Typically, the rear wheels are either kept in neutral position or steered slightly in an opposite phase to the front wheels when making a sharp turn with the aim of reducing the under-steer tendency in such a situation, and allowing the vehicle to make a brisk yaw movement. For instance, Japanese patent laid-open publication No. 59-77970 discloses a four-wheel steering system which comprises a steering unit for steering front wheels, a rear wheel steering unit for steering rear wheels, a vehicle speed sensor, and a rear wheel steering angle controller which increases the steering angle of the rear wheels in proportion to the increase in the steering angle of the front wheels when the front wheel steering angle is below a certain threshold value, and reduces the rate of increase of the rear wheel steering angle with the increase in the front wheel steering angle when this threshold value has been reached, this threshold value being progressively lowered as the vehicle speed decreases, so that the lateral acceleration acting on the rear wheels may be increased in a high speed range and reduced in a low speed range, and the maneuverability of the vehicle may be increased in both high and low speed ranges.

However, depending on the situation, if the rear wheels are steered in an opposite phase to the front wheels, the side force of the rear wheels may reach a saturation region, and the slip angle of the rear wheels may become excessive. In such a case, the yaw rate of the vehicle is strongly affected by the application of brake, the releasing of the accelerator pedal and the turning back of the steering wheel, and, in extreme cases, the behavior of the vehicle may become uncomfortably unstable. In particular, on a low frictional coefficient road surface typically found on a gravel road and an icy road, this tendency becomes pronounced.

It was also proposed in the copending U.S. patent application Ser. No. 08/122,615 filed Sep. 16, 1993, now U.S. Pat. No. 5,528,497; Ser. No. 08/161,139 filed Dec. 2, 1993, now U.S. Pat. No. 5,448,481; Ser. No. 08/218,134 filed Mar. 25, 1994, now U.S. Pat. No. 5,448,482; Ser. No. 08/218,135 filed Mar. 25, 1994, Ser. No. 08/218,116 filed Mar. 25, 1994, now U.S. Pat. No. 5,481,457; and Ser. No. 08/379,988 filed Jan. 27, 1995, now U.S. Pat. No. 5,489,004 to compute a deviation of the actual yaw rate of the vehicle from a standard yaw rate determined according to the steering angle of the steering wheel and the vehicle speed, and carry out a feedback control of the rear wheel steering angle for the purpose of optimizing the dynamic response of the vehicle, and removing the adverse influences of the external disturbances and the changes in the running conditions of the vehicle on the behavior of the vehicle. The contents of these copending applications are incorporated in the present application by reference.

BRIEF SUMMARY OF THE INVENTION

In view of the above mentioned problems of the prior four wheel steering vehicles, a primary object of the present invention is to provide a method for controlling a front and rear wheel steering vehicle which can control the under-steer tendency of the vehicle when making a turn involving a large steering angle and ensure the stability of the vehicle in high lateral acceleration situations.

A second object of the present invention is to provide a method for controlling a front and rear wheel steering vehicle which can maximize the maneuverability of the vehicle without sacrificing the stability of the vehicle.

A third object of the present invention is to provide a method for controlling a front and rear wheel steering vehicle which allows the vehicle operator to take advantage of the maneuverability of the front and rear wheel steering vehicle without experiencing any unnatural impression.

According to the present invention, these and other objects can be accomplished by providing a method for controlling a front and rear wheel steering vehicle comprising front wheels that can be steered according to a steering input, and rear wheels that can be steered according to the steering angle of the front wheels and a running condition of the vehicle, wherein: the rear wheels are steered in an opposite phase relationship to the front wheels to offset an under-steer tendency of the vehicle when a lateral acceleration acting on the vehicle is between a first prescribed value and a second prescribed value higher than the first prescribed value, and the vehicle would otherwise demonstrate an under-steer tendency, and in a same phase relationship to the front wheels to prevent an excessive slip angle from developing in the rear wheels when the detected lateral acceleration is greater than the second prescribed value, and the slip angle of the vehicle body would otherwise become excessive.

Thus, according to the present invention, in a region where the front wheels and the rear wheels involve a substantially identical slip angle, the phase difference between the front wheels and the rear wheels is reduced so that a substantially neutral steering property can be achieved. As the lateral acceleration increases further, and the under-steer tendency of the vehicle would otherwise increase due to an increased slip angle of the front wheels, the rear wheels are steered to a somewhat larger angle in an opposite phase relationship to extend the region of a high maneuverability to a higher lateral acceleration region. In a region involving an even greater lateral acceleration which would otherwise give rise to an excessive slip angle of the rear wheels, the rear wheels are steered in a same phase relationship to the front wheels, and the cornering force of the rear wheels is increased so that the slip angle of the vehicle may be controlled, and the lateral stability of the vehicle may be ensured.

Typically, in a low lateral acceleration region in which the vehicle involves almost no slip angle, the rear wheel are steered in an opposite phase to the front wheels, and the vehicle is therefore made capable of going through narrow alleys and making a highly brisk yaw movement.

The lateral acceleration which serves as the basis for the method of the present invention can be either directly measured by using a lateral acceleration sensor or computed according to a speed of the vehicle and a front wheel steering angle. Obviously, the yaw rate of the vehicle can be treated as an equivalent of the lateral acceleration if desired, and can be used for the same purpose.

The present invention can be implemented in a number of ways. According to a preferred embodiment of the present invention, a standard yaw rate is computed according to a speed of the vehicle and a steering input, and the rear wheels are steered so as to bring an actual yaw rate of the vehicle into agreement with the standard yaw rate, the standard yaw rate being modified by the lateral acceleration so as to offset the under-steer tendency and prevent the excessive slip angle.

According to one aspect of the present invention, the rear wheels are steered in an opposite phase relationship to the front wheels so long as a lateral acceleration acting on the vehicle is within a range which would not give rise to any excessive slip angle of the rear wheels. According to another aspect of the present invention, at a certain traveling speed of the vehicle, the rear wheels are steered in a same phase relationship, an opposite phase relationship, and a same phase relationship, in that order, as a steering angle of the front wheels is increased.

BRIEF DESCRIPTION OF THE DRAWINGS

Now the present invention is described in the following with reference to the appended drawings, in which:

FIG. 14(a), 14(b), 14(c) are graphs showing the ratio of the rear wheel steering angle to the front wheel steering angle for different speed ranges based on the feedforward control.

DETAILED DESCRIPTION OF THE PREFERRED EMBODIMENTS

Figure 1:
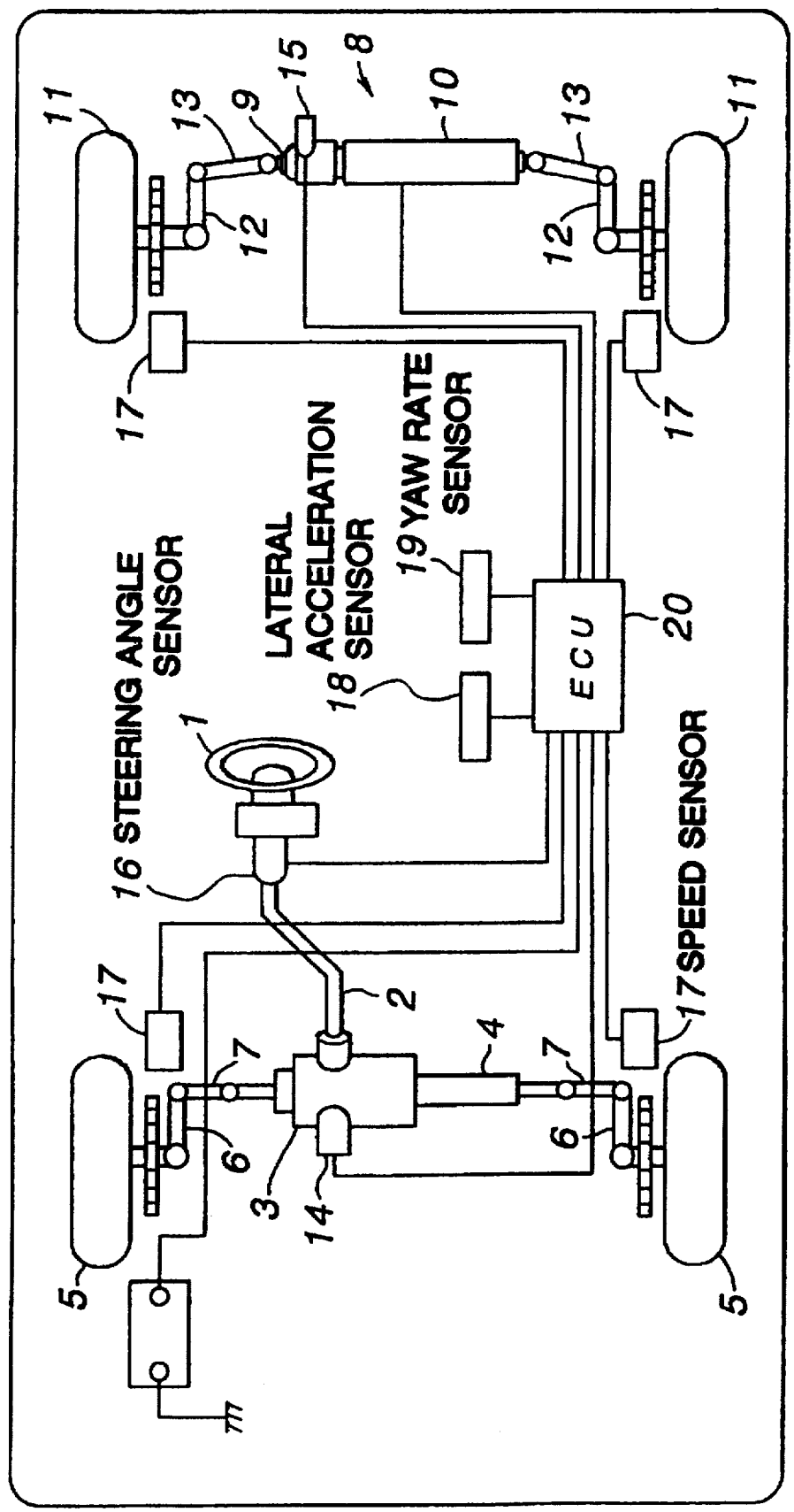
FIG. 1 is a diagram generally showing a four wheel steering vehicle to which the present invention is applied.

FIG. 1 shows the overall structure of a front and rear wheel steering device to which the present invention is applied. A steering wheel 1 is fixedly attached to the upper end of a steering shaft 2 which is in turn mechanically coupled to a steering rod 4 of a front wheel steering device 3 at its lower end. The two ends of the steering rod 4 are coupled to knuckle arms 6 of right and left front wheels 5 via tie rods 7, respectively.

A rear wheel steering device 8 is disposed in a rear part of the vehicle, and comprises an electric motor 10 for actuating a steering rod 9 extending laterally of the vehicle body. The two ends of the steering rod 9 are coupled to knuckle arms 12 of right and left rear wheels 11 via tie rods 13, respectively.

The front and rear wheel steering devices 3 and 8 are provided with steering angle sensors 14 and 15 for detecting the steering angles of the front and rear wheels 5 and 11 from the displacements of the steering rods 4 and 9, respectively, while the steering shaft 2 is provided with a steering angle sensor 16 for sensing the steering angle of the steering wheel. The wheels 5 and 11 are each provided with a vehicle speed sensor 17, and a lateral acceleration sensor 18 and a yaw rate sensor 19 are provided in suitable locations of the vehicle body. These sensors 14 to 19 are electrically connected to a computer unit 20 for controlling the operation of the electric motor 10.

According to this steering system, as the vehicle operator turns the steering wheel 1, the steering rod 4 of the front wheel steering device 3 is mechanically actuated (typically, power assisted either hydraulically or electrically) and the front wheels 5 are steered accordingly. At the same time, the steering angle of the steering wheel 1 and the displacement of the steering rod 4 are supplied to the computer unit 20 via the steering angle sensors 16 and 14, respectively. Thus, according to the input values of the front wheel steering angle, the vehicle speed, the lateral acceleration, and the yaw rate, the computer unit 20 determines the optimum steering angle of the rear wheels 11, and drives the electric motor 10 until the rear wheels 11 are steered to this optimum steering angle.

Figure 2:
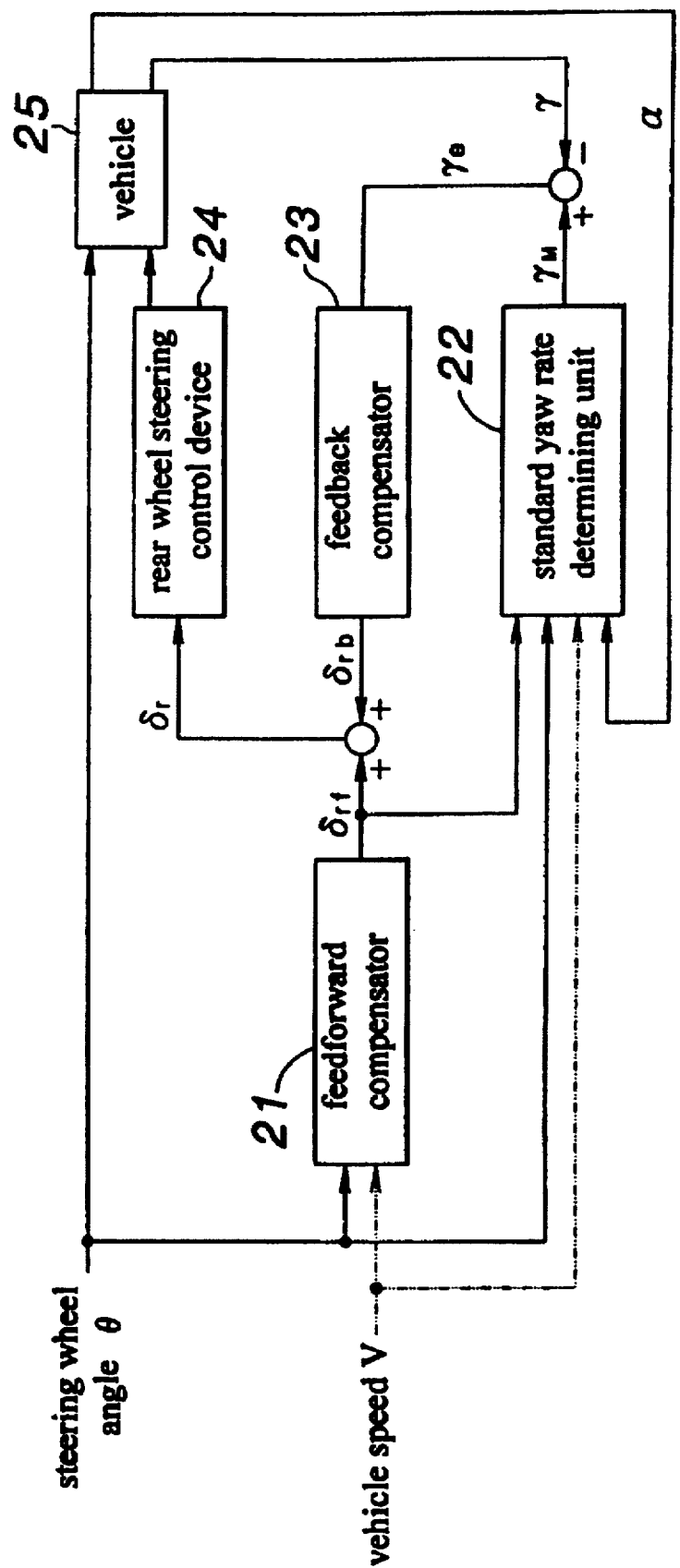
FIG. 2 is a block diagram showing the general principle of the method of the present invention.
Figure 3:
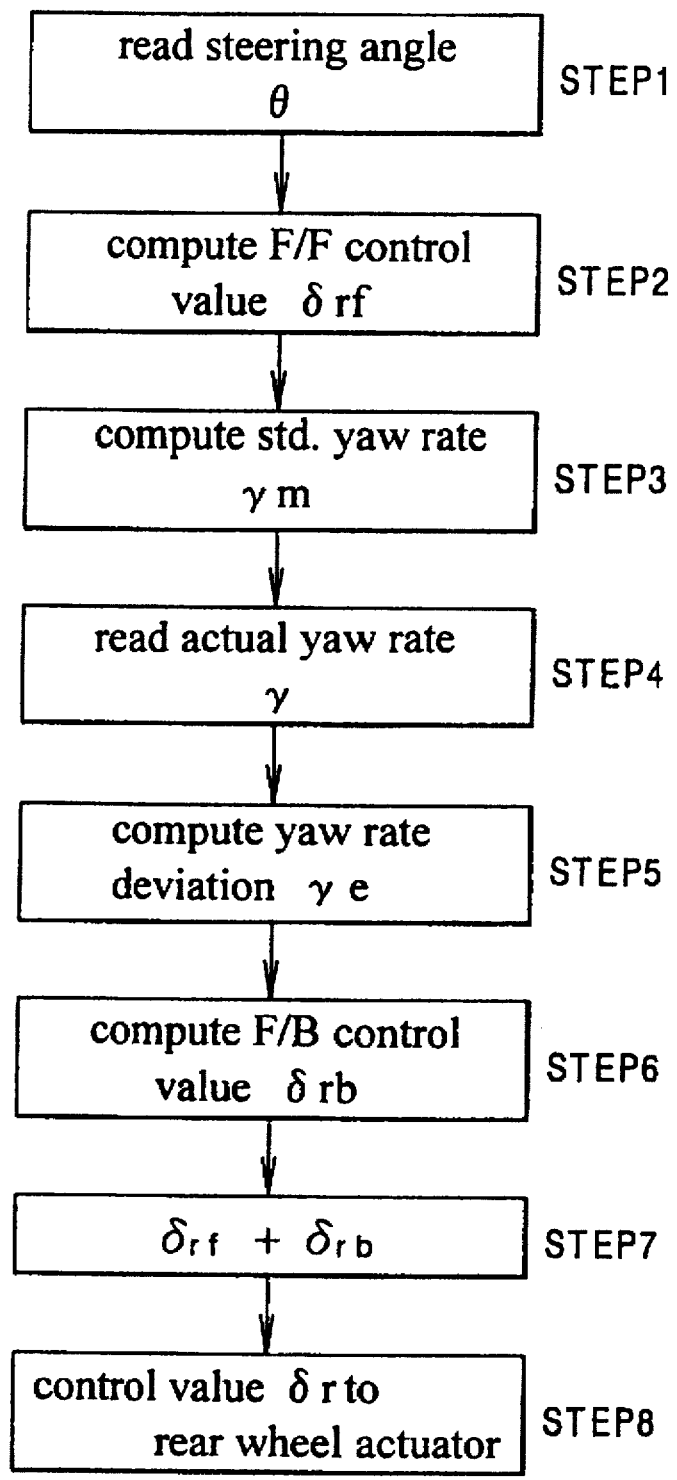
FIG. 3 is a flow chart of a preferred embodiment of the method of the present invention.

Now the flow of the control executed by the computer unit 20 is described in the following with reference to FIGS. 2 and 3.

Figure 4:
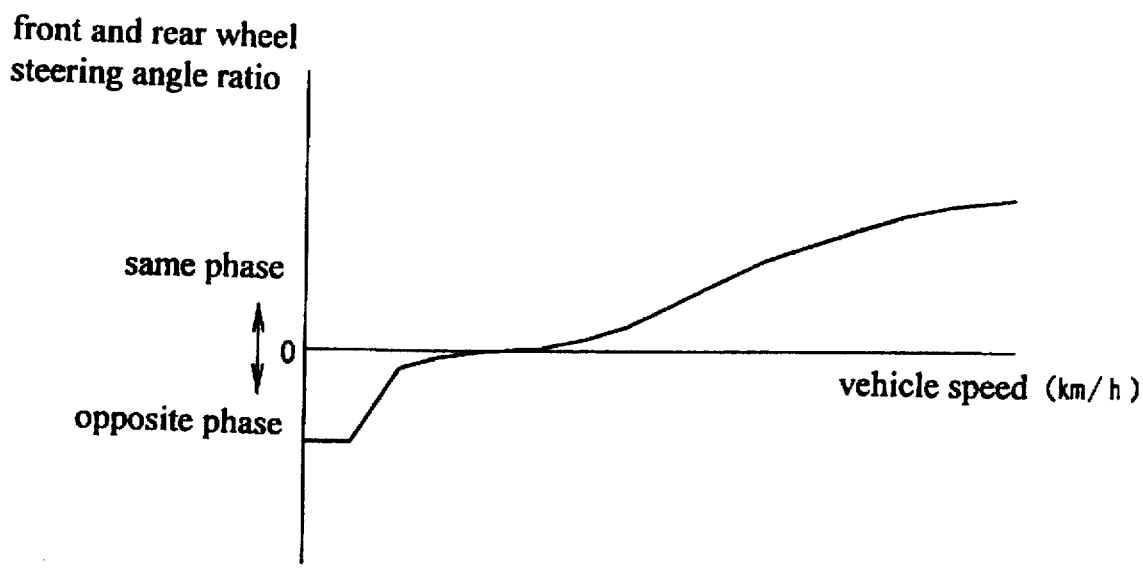
FIG. 4 is a graph showing the relationship between the vehicle speed and the ratio of the rear wheel steering angle to the front wheel steering angle.

First of all, the steering angle θ of the steering wheel 1 is read in step 1. A feedforward compensator 21 computes, in step 2, a feedforward control value δrf for each given steering wheel steering angle θ according to a predetermined ratio of the rear wheel steering angle to the front wheel steering angle for each given vehicle speed as shown in FIG. 4. In this case, a vehicle stability is ensured in a high speed range by selecting a same phase steering angle ratio so as to eliminate any slip angle in the high speed range, and a favorable maneuverability is ensured in a low speed range by selecting an opposite phase steering angle ratio which is small enough not to create any unfamiliar impression.

A standard yaw rate determining unit 22 receives the steering angle θ, the feedforward control value δrf, and the output α of the lateral acceleration sensor 18, and produces a standard yaw rate γM corresponding to the current front wheel steering angle θ in step 3. An actual yaw rate γ is produced from the yaw rate sensor 19 in step 4, and this value is also supplied to the standard yaw rate determining unit 22, and the deviation γe of the actual yaw rate γ from the standard yaw rate γM is supplied to a feedback compensator 23 in step 5.

The feedback compensator 23 computes a feedback control value according to the deviation γe of the actual yaw rate γ from the standard yaw rate γM, and produces a rear wheel steering angle feedback control command signal δrb in step 6, and the sum of this feedback control command signal δrb and the feedforward control command signal δrf is supplied to a rear wheel steering control device 24 in step 7. The rear wheel steering control device 24 then controls the rear wheel steering angle δr so as make the actual response of the vehicle correspond to the standard yaw rate γM in step 8.

Figure 5:
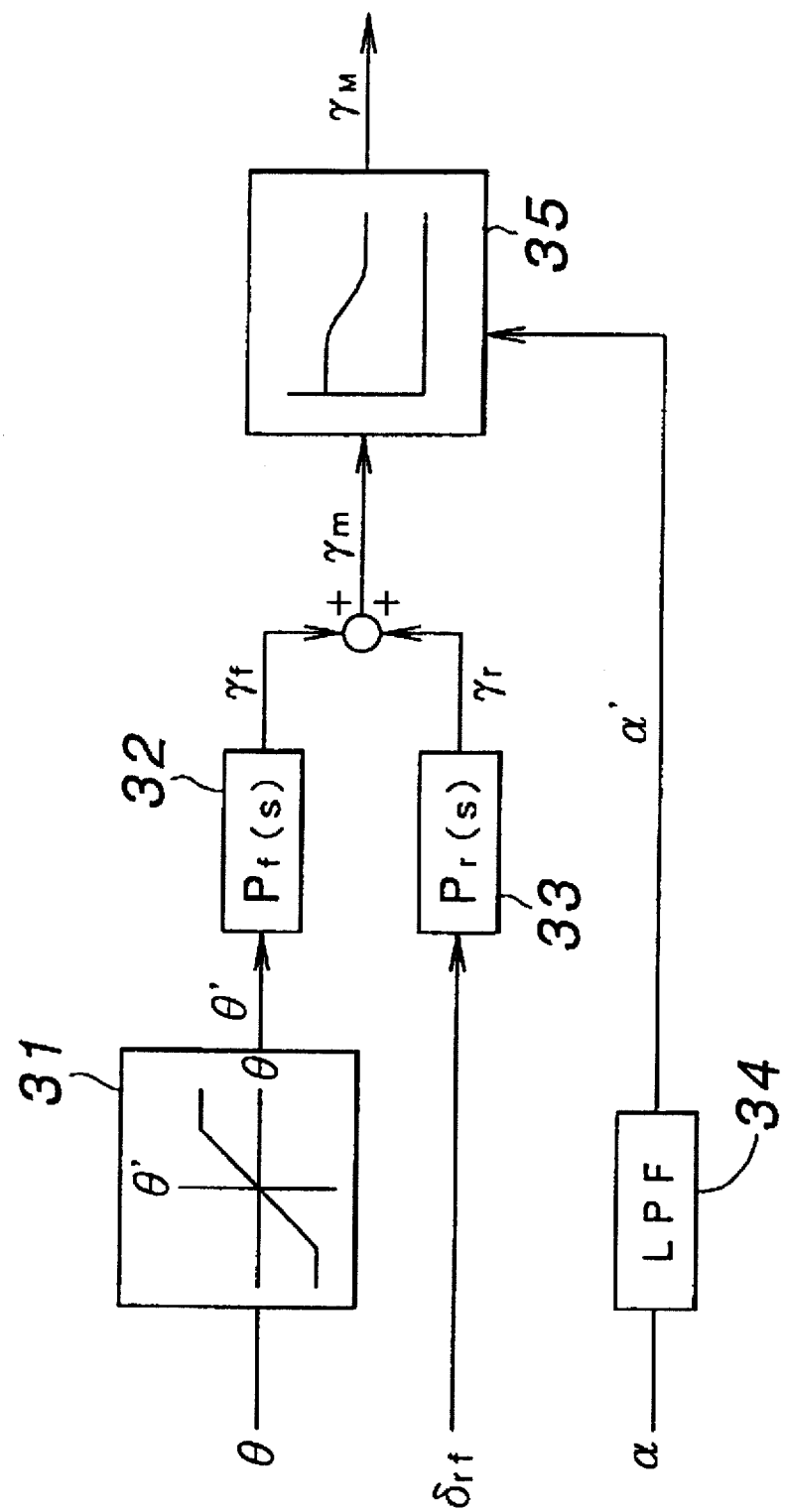
FIG. 5 is a block diagram of a first model for generating a standard yaw rate.
Figure 6:
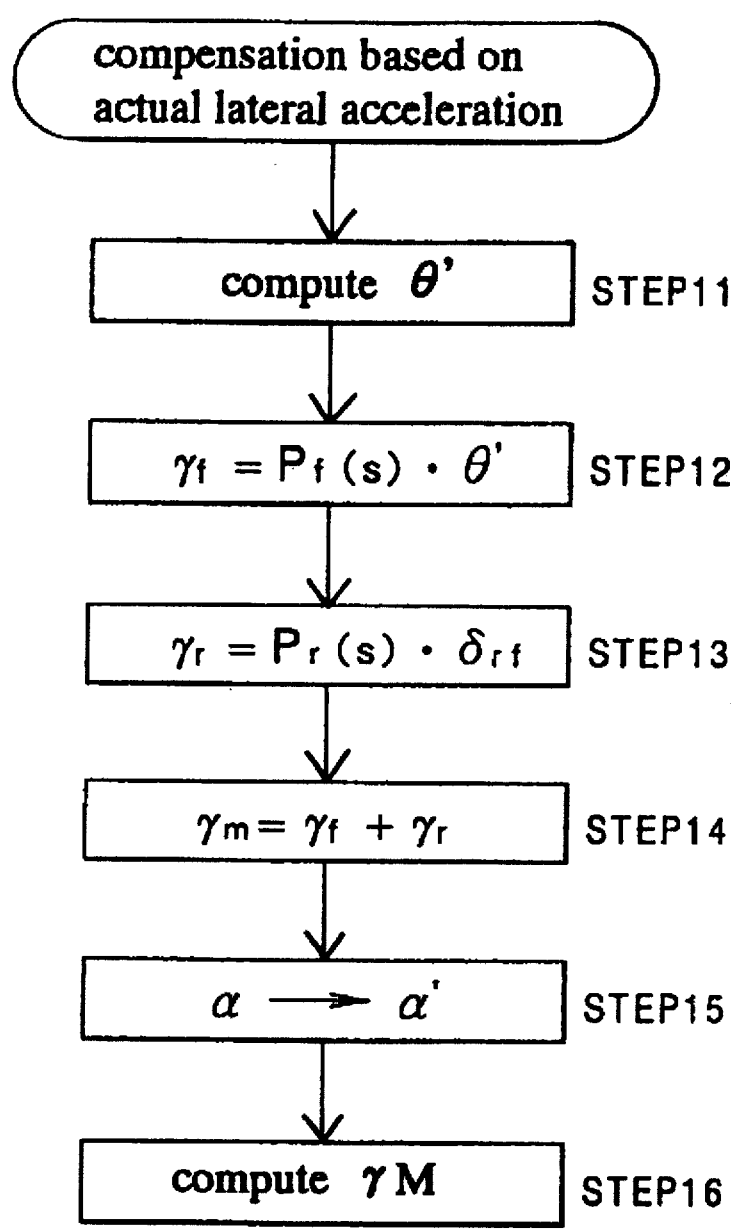
FIG. 6 is a flow chart showing the operation of the first model.

Now the first model for compensating the standard yaw rate according to the actual lateral acceleration is described in the following with reference to FIGS. 5 and 6.

The steering wheel steering angle θ supplied to the standard yaw rate determining unit 22 is forwarded to a limiter circuit 31 which sets an upper limit to the absolute value of the steering angle θ so as to prevent any impractical standard yaw rate from being generated in step 11. The upper limit may vary depending on the vehicle speed V. An arithmetic unit 32 computes a standard yaw rate γf from the steering angle θ' produced from the limiter 31 according to a previously determined transfer function between the input steering angle and the resulting actual yaw rate of the vehicle in step 12. At the same time, another arithmetic unit 33 computes a standard yaw rate γr from the feedforward control command signal δrf for the rear wheels 11 according to the transfer function between the steering angle of the rear wheels 11 and the resulting actual yaw rate of the vehicle in step 13. These two standard yaw rates γf and γr are summed up to produce a final standard yaw rate γm in step 14. The above mentioned transfer functions may be determined according to discrete models whose parameters change with the vehicle speed.

The output of the lateral acceleration sensor 18 is smoothed out by passing it through a low pass filter 34 or by taking a moving average in step 15. A compensation coefficient is obtained by looking up a compensation coefficient table 35 using the smoothed lateral acceleration α' as an index, and the standard yaw rate γm is compensated by this coefficient into a compensated standard yaw rate γM in step 16. Thereby, a desirable yaw rate can be achieved for each given steering angle θ of the steering wheel 1.

Figure 7:
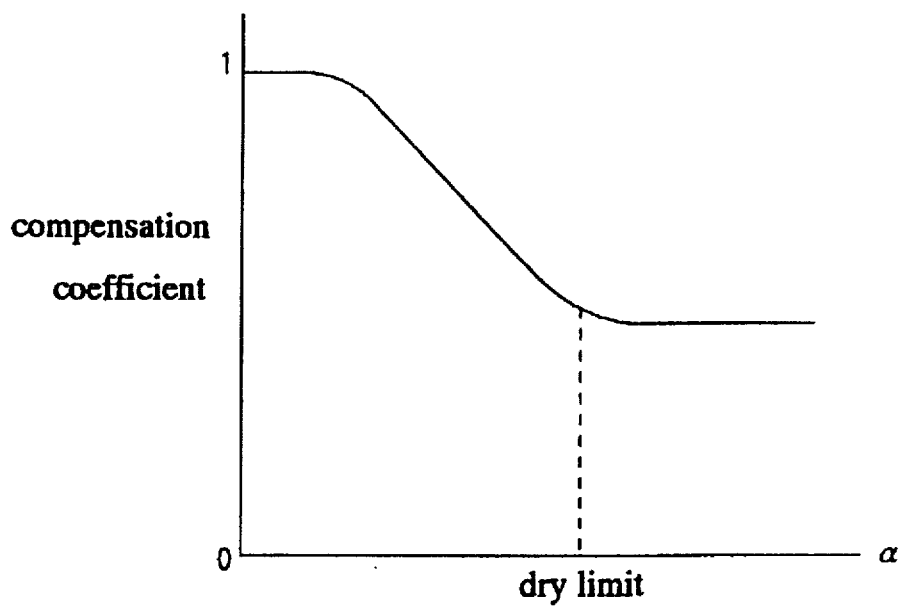
FIG. 7 is a graph showing the relationship between the compensation coefficient and the lateral acceleration according to the first model.

In a high lateral acceleration range where the cornering force of the tires saturates, the yaw rate response demonstrates a nonlinear tendency. As a result, if the standard yaw rate is determined by considering only the linear response of the vehicle, the deviation of the actual yaw rate from the standard yaw rate becomes so great in a high lateral acceleration range that the opposite phase steering angle of the rear wheels may become excessive. This causes a reduction in the cornering force of the rear wheels, and the slip angle of the vehicle body increases to such an extent that the stability of the vehicle may be lost. In view of this fact, according to this embodiment, in a high lateral acceleration range when the road gripping capability of the tires may reach a limit, the standard yaw rate is compensated by using the compensation coefficient given by the graph of FIG. 7 so as to reduce the standard yaw rate with the increase in the lateral acceleration α. Thus, in the range where the road gripping capability of the tires may be lost, the rear wheels are steered in such a manner that the under-steer tendency of the vehicle may be enhanced. As a result, the slip angle of the vehicle is reduced, and the vehicle response is stabilized.

Figure 8:
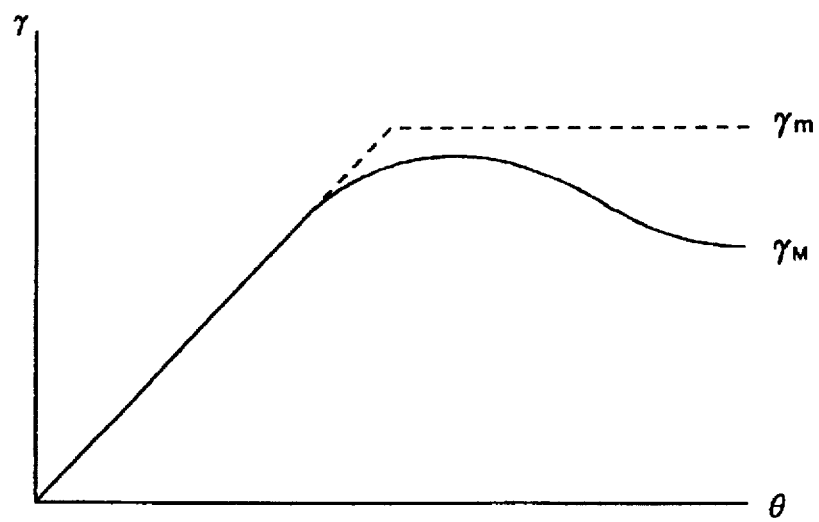
FIG. 8 is a graph showing the relationship between the standard yaw rate and the steering wheel angle for a given vehicle speed according to the first model.

The resulting relationships of the steering wheel angle to the standard yaw rate γm and the compensated yaw rate γM are shown in the graph of FIG. 8.

Figure 9:
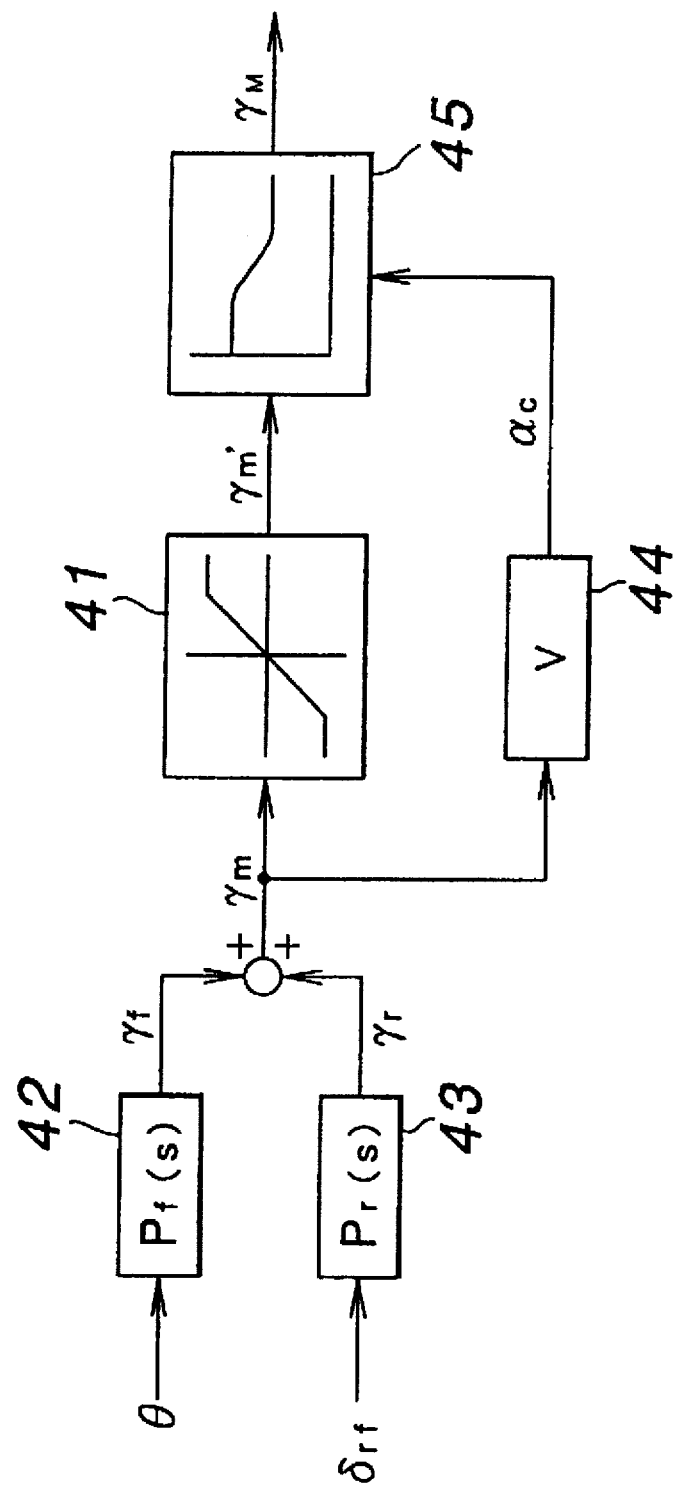
FIG. 9 is a block diagram of a second model for generating a standard yaw rate.
Figure 10:
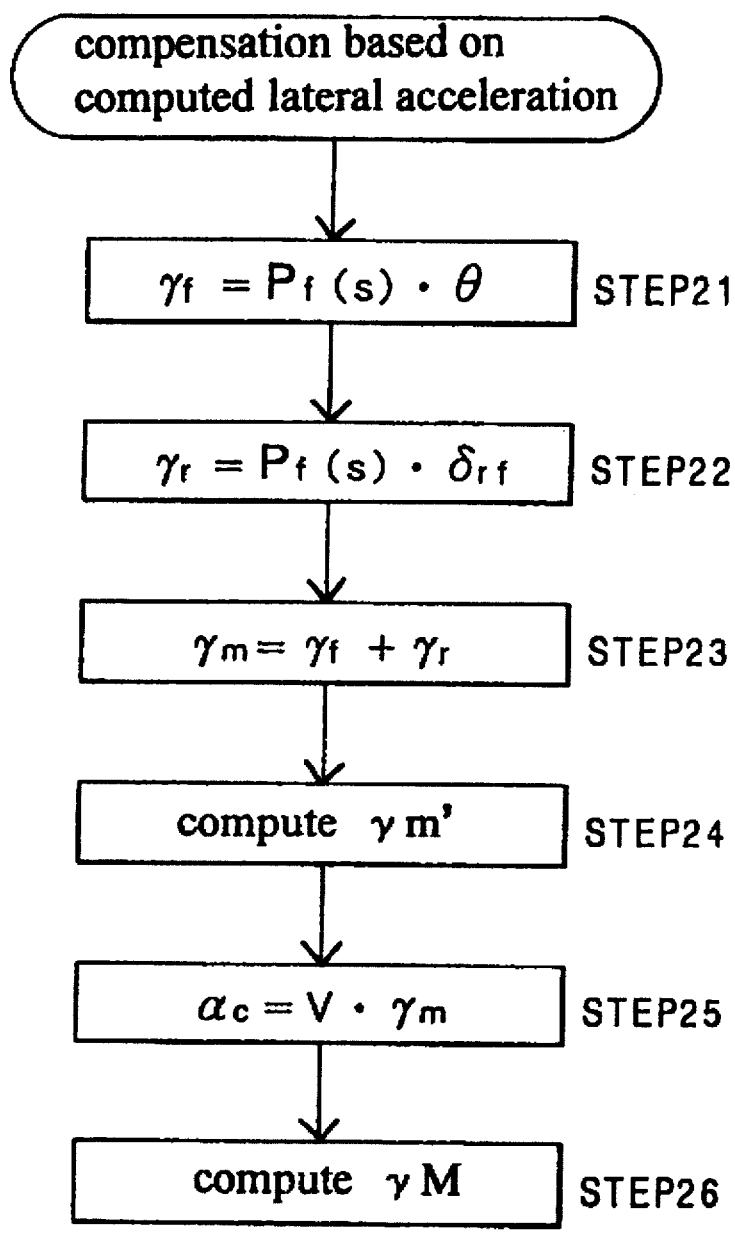
FIG. 10 is a flow chart showing the operation of the second model.

Now the second model for compensating the standard yaw rate γm according to the lateral acceleration αc computed from the steering wheel angle θ and the vehicle speed V is described in the following with reference to FIGS. 9 and 10.

The steering wheel steering angle θ supplied to the standard yaw rate determining unit 22 is forwarded to an arithmetic unit 42 which computes a standard yaw rate γf from the steering wheel steering angle θ according to a transfer function between the input to the steering wheel 1 and the resulting actual yaw rate response of the vehicle body in step 21. At the same time, another arithmetic unit 43 computes a standard yaw rate γr from the feedforward control command signal δrf for the rear wheels 11 according to the transfer function between the steering angle of the rear wheels 11 and the resulting actual yaw rate of the vehicle in step 22. These two standard yaw rates γf and γr are summed up to produce a final standard yaw rate γm in step 23. This standard yaw rate γm is forwarded to a limiter circuit 41 which sets an upper limit to the absolute value of the standard yaw rate γm so as to prevent any impractical standard yaw rate from being generated in step 24.

Figure 11:
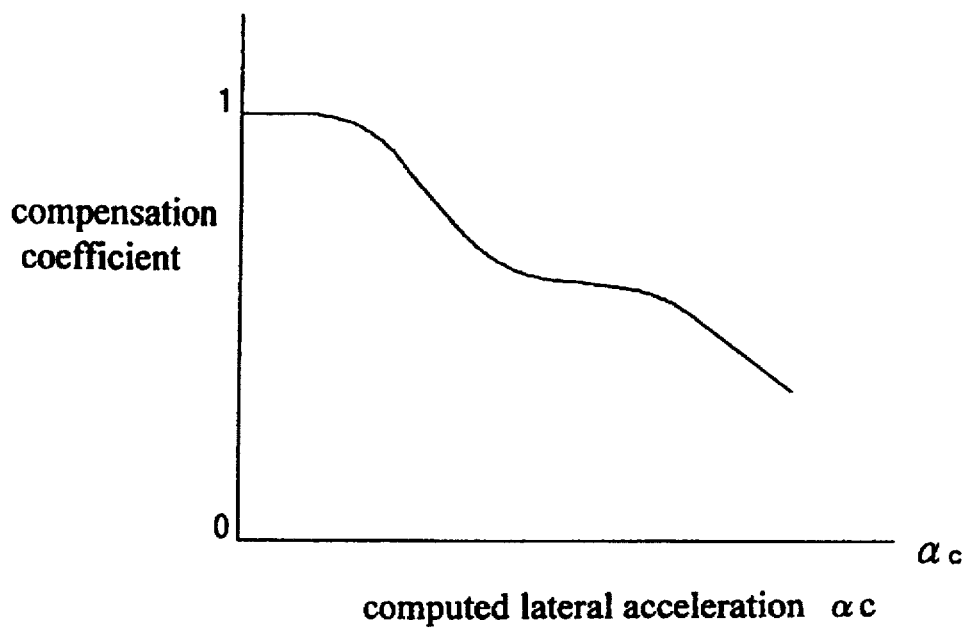
FIG. 11 is a graph showing the relationship between the compensation coefficient and the lateral acceleration according to the second model.

Meanwhile the standard yaw rate γm is converted by an arithmetic unit 44 into a lateral acceleration value αc according to the current vehicle speed V in step 25. A compensation coefficient is obtained by looking up a compensation coefficient table 45 corresponding to the table in (FIG. 11) using the lateral acceleration αc as an index, and a compensated standard yaw rate γM is obtained by compensating the limited standard yaw rate γm' with the thus obtained compensation coefficient in step 26. Thus, an optimum yaw rate can be obtained for each given steering wheel steering angle θ.

Figure 12:
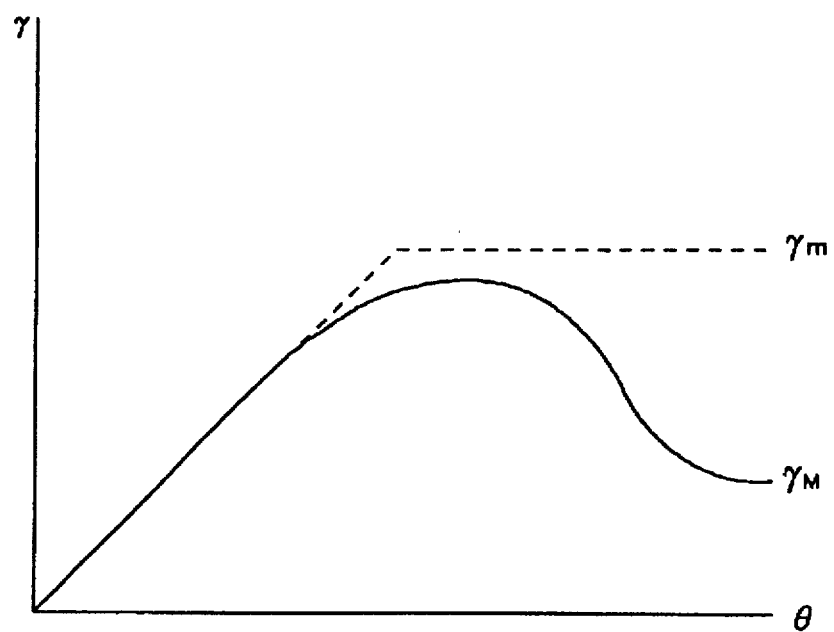
FIG. 12 is a graph showing the relationship between the standard yaw rate and the steering wheel angle for a given vehicle speed according to the second model.

Because the lateral acceleration αc is computed from the steering wheel steering angle θ and the vehicle speed V, a desired turning maneuverability can be achieved even on a road surface having a low frictional coefficient such as a gravel road surface. The resulting relationships of the steering wheel angle θ to the standard yaw rate γm and the compensated yaw rate γM are shown in the graph of FIG. 12.

Figure 13:
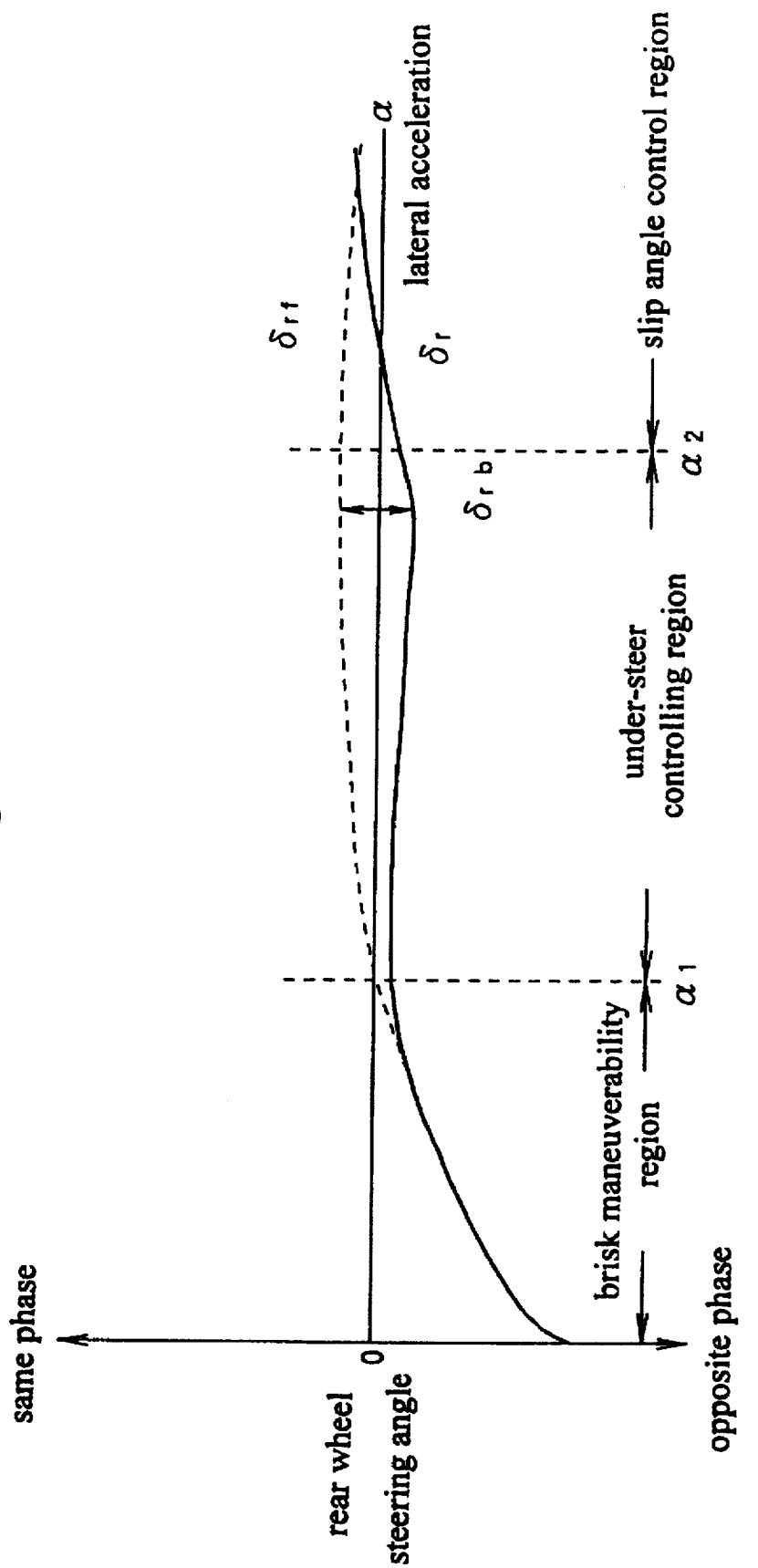
FIG. 13 is a graph showing the relationship between the rear wheel steering angle and the lateral acceleration when making a steady turning maneuver.

Now a concrete example of the rear wheel steering control is described in the following with reference to FIG. 13 showing the relationship between the lateral acceleration α and the rear wheel steering angle δr during a steady state turning maneuver.

Brisk Maneuverability Region

In a low speed range where the lateral action α acting on the vehicle body is extremely small, as there is a relatively small slip angle and the cornering force of the rear wheels is accordingly small, there is a tendency for over-steer. Therefore, in a low lateral acceleration range, to the end of ensuring the capability to make a brisk turning maneuver without involving any substantial slip angle, the rear wheels are steered in an opposite phase relationship to the front wheels, and a certain amount of cornering force is produced in the rear wheels. In short, in an extremely low speed range where the dynamic response of the vehicle is of no significance, the rear wheels are steered in an opposite phase relationship, and a brisk turning maneuver is made possible. As the lateral acceleration of the vehicle is increased, and the yaw moment acting on the vehicle is increased, the rear wheel steering angle is brought closer to zero to cancel the cornering force of the rear wheels, and any unfamiliar behavior of the vehicle is prevented from being produced. In short, in an intermediate speed range, the tendency of the vehicle to undergo a brisk turning maneuver is somewhat controlled to prevent any unfamiliar impression from being created.

Under-Steer Controlling Region

With the feedforward control command signal δrf alone, the steering angle ratio of the rear wheels to the front wheels would be brought to a same phase relationship above a certain vehicle speed. However, in that case, because the increase in the lateral acceleration will cause the cornering force of the front wheels to reach a point of saturation before the cornering force of the rear wheels reaches a point of saturation, there will be an increasing tendency for under-steer as the vehicle speed increases. Therefore, according to this embodiment, when the lateral acceleration exceeds a first prescribed value α1, the rear wheels 11 are steered somewhat in an opposite phase relationship by adding the feedback control command signal δrb to the feedforward control command signal δrf to control the tendency for under-steer.

Slip Angle Control Region

As the lateral acceleration increases further, and the cornering force of the rear wheels also reaches a point of saturation, the slip angle of the vehicle body becomes undesirably great. Therefore, according to this embodiment, when the lateral acceleration exceeds a second prescribed value α2 which is higher than the first prescribed value α1, the rear wheels are steered in a same phase relationship to the front wheels so that the cornering force of the rear wheels is reduced below the point of saturation, and the lateral response of the vehicle may be stabilized by controlling the slip angle of the vehicle body.

In the above described embodiments, the standard yaw rate control was based on the combination of the yaw rate feedforward control and the yaw rate feedback control, but the present invention can be also applied to a system which is based strictly on the feedforward control. Such a control system can be achieved by eliminating the yaw rate sensor and the feedback control process from the system illustrated in FIGS. 1 to 3. In this case also, a similar result can be obtained by carrying out a rear wheel steering angle control according to a map as given by the graphs of FIGS. 14(a), 14(b), 14(c) which define the relationship between the steering wheel steering angle θ and the feedforward control command signal δrf for different vehicle speed ranges. In particular, in an intermediate speed range above a certain threshold level, the rear wheels are steered in relation to the front wheels in a same phase relationship, opposite phase relationship and same phase relationship, in that order, as the vehicle speed is increased.

Thus, according to the present invention, the maneuverability of the vehicle, in particular the yaw response of the vehicle, is improved by steering the rear wheels in opposite phase relationship to the front wheels in a low lateral acceleration range where the slip angle of the vehicle is relatively small. In an intermediate range where the slip angle of the rear wheels approximately coincides with the slip angle of the vehicle body, the phase difference between the steering angles of the front wheels and the rear wheels is reduced so as to achieve a neutral-steer property (in other words, the steering angle of the rear wheels is controlled although it still remains in the opposite phase relationship). In a high end of the intermediate lateral acceleration range, the rear wheels are steered in a somewhat more opposite phase relationship so as to control the under-steer tendency of the vehicle which arises from the cornering force of the front wheels reaching a point of saturation. In a high lateral acceleration range where the cornering force of the rear wheels would otherwise reach a point of saturation, the rear wheels are steered in a same phase relationship to the front wheels so as to somewhat reduce the slip angle of the vehicle body and to stabilize the lateral response of the vehicle. Thus, the present invention can control the under-steer tendency in large steering angle situations, and can ensure a stable vehicle response when making a sharp turn involving a large lateral acceleration.

Although the present invention has been described in terms of specific embodiments, it is possible to modify and alter details thereof without departing from the spirit of the present invention.

What we claim is:

1. A method for controlling a front and rear wheel steering vehicle having front wheels that can be steered according to a steering input, and rear wheels that can be steered according to the steering angle of the front wheels and a running condition of the vehicle, comprising the steps of:
   (a) steering said rear wheels in an opposite phase relationship to said front wheels to offset an under-steer tendency of said vehicle when a lateral acceleration acting on said vehicle is between a first prescribed value and a second prescribed value higher than said first prescribed value, and
   (b) steering said rear wheels in a same phase relationship to said front wheels to prevent an excessive slip angle from developing in said rear wheels when said lateral acceleration is greater than said second prescribed value, and a slip angle of said vehicle body would otherwise develop the excessive slip angle in said rear wheels.

2. A method for controlling a front and rear wheel steering vehicle according to claim 1, wherein said rear wheels are steered in an opposite phase relationship when said lateral acceleration is lower than said first prescribed value.

3. A method for controlling a front and rear wheel steering vehicle according to claim 1, wherein said lateral acceleration of said vehicle is measured by a lateral acceleration sensor.

4. A method for controlling a front and rear wheel steering vehicle according to claim 1, wherein said lateral acceleration of said vehicle is computed according to a speed of said vehicle and a front wheel steering angle.

5. A method for controlling a front and rear wheel steering vehicle according to claim 1, wherein a standard yaw rate is computed according to a speed of said vehicle, and said rear wheels are steered so as to bring an actual yaw rate of said vehicle into agreement with said standard yaw rate, said standard yaw rate being modified by said lateral acceleration so as to offset said under-steer tendency and prevent said excessive slip angle.

6. A method for controlling a front and rear wheel steering vehicle according to claim 5, wherein said standard yaw rate is modified by being multiplied by a compensation coefficient determined from said lateral acceleration.

7. A method for controlling a front and rear wheel steering vehicle according to claim 5, wherein said yaw rate is limited within a prescribed range prior to being modified by said lateral acceleration.

8. A method for controlling a front and rear wheel steering vehicle according to claim 1, wherein said first prescribed value is greater than zero.

9. A method for controlling an increasingly front and rear wheel steering vehicle according to claim 1, wherein the rear wheels are steered to a larger angle in the opposite phase relationship to said front wheels as said lateral acceleration increases from a value near said first prescribed value toward said second prescribed value during a steady state turning maneuver.

10. A method for controlling a front and rear wheel steering vehicle according to claim 1, wherein said rear wheels are steered based additionally on a combination of yaw rate feedforward control determined from said steering input and yaw rate feedback control determined from a detected yaw rate.

11. A method for controlling a front and rear wheel steering vehicle comprising the steps of:

(a) steering front wheels according to a steering input;

(b) steering rear wheels according to a steering angle of the front wheels and a running condition of the vehicle; and (c) said rear wheels are steered in an opposite phase relationship to said front wheels so long as a lateral acceleration acting on said vehicle is within a range which would not give rise to any excessive slip angle of said rear wheels.

12. A method for controlling a front and rear wheel steering vehicle according to claim 11, further including the step of:

(d) steering said rear wheels in a same phase relationship above a prescribed high lateral acceleration value so as to enhance an under-steer tendency of the vehicle.

13. A method for controlling a front and rear wheel steering vehicle according to claim 11, wherein a standard yaw rate is computed according to said steering input and a speed of said vehicle, and said rear wheels are steered in said step (b) so as to bring an actual yaw rate of said vehicle into agreement with said standard yaw rate, said standard yaw rate being modified in said step (c) based on said lateral acceleration so as to prevent any excessive slip angle of said rear wheels.

14. A method for controlling a front and rear wheel steering vehicle according to claim 11, further including the step of:

(d) steering said rear wheels in a same phase relationship to said front wheels when the lateral acceleration acting on said vehicle exceeds the range which would give rise to excessive slip angle of the rear wheels so as to reduce a cornering force of the rear wheels below a point of saturation therefor.

15. A method for controlling a front and rear wheel steering vehicle according to claim 14, wherein a single control means is used for effecting steering of said rear wheels in said opposite phase relationship and in said same phase relationship to said front wheels.

16. A method for controlling a front and rear wheel steering vehicle comprising the steps of:

(a) steering front wheels according to a steering input;

(b) steering rear wheels according to the steering angle of the front wheels and a running condition of the vehicle; and (c) at a certain traveling speed of said vehicle, steering said rear wheels at a same phase relationship, an opposite phase relationship, and a same phase relationship, in that order, relative to a steering direction of the front wheels as a steering angle of said front wheels increases.

17. A method for controlling a front and rear wheel steering vehicle according to claim 16, wherein said certain traveling speed of said vehicle is in an intermediate speed range.

18. A method for controlling a front and rear wheel steering vehicle according to claim 17, wherein said intermediate speed range is in a range of 50 through 120 km/h.

19. A method for controlling a front and rear wheel steering vehicle according to claim 16, wherein said rear wheels are steered in said steps (b), (c) based exclusively on a feed forward control command signal determined from the steering input and vehicle speed.

20. A method for controlling a front and rear wheel steering vehicle according to claim 19, wherein said rear wheels are steered based on a plurality of feed forward command signals corresponding to different vehicle speed ranges.

* * * * *

UNITED STATES PATENT AND TRADEMARK OFFICE
CERTIFICATE OF CORRECTION

PATENT NO. : 5,627,754

DATED : May 6, 1997

INVENTOR(S) : Nobuyoshi Asanuma, Kiyoshi Wakamatsu and Manabu Ikegaya

It is certified that error appears in the above-indentified patent and that said Letters Patent is hereby corrected as shown below:

Column 8, line 63, change "a" to --an increasingly--.

Signed and Sealed this

Twenty-sixth Day of August, 1997

Attest:

BRUCE LEHMAN

*Attesting Officer*    *Commissioner of Patents and Trademarks*